(12) United States Patent
Albanese et al.

(10) Patent No.: US 11,564,200 B2
(45) Date of Patent: Jan. 24, 2023

(54) USER LOCALIZATION IN A WIRELESS CELLULAR NETWORK

(71) Applicant: NEC Laboratories Europe GmbH, Heidelberg (DE)

(72) Inventors: Antonio Albanese, Heidelberg (DE); Vincenzo Sciancalepore, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/771,013

(22) PCT Filed: Jun. 19, 2020

(86) PCT No.: PCT/EP2020/067131
§ 371 (c)(1),
(2) Date: Apr. 22, 2022

(87) PCT Pub. No.: WO2021/254636
PCT Pub. Date: Dec. 23, 2021

(65) Prior Publication Data
US 2022/0369279 A1 Nov. 17, 2022

(51) Int. Cl.
*H04W 64/00* (2009.01)
*H04W 16/28* (2009.01)

(52) U.S. Cl.
CPC .......... *H04W 64/006* (2013.01); *H04W 16/28* (2013.01)

(58) Field of Classification Search
CPC ............... H04W 24/02; H04W 72/082; H04W 72/1278; H04W 88/02; H04W 4/029; H04W 16/28; H04W 12/63; H04W 72/0453
See application file for complete search history.

(56) References Cited

U.S. PATENT DOCUMENTS

2017/0244524 A1* 8/2017 Hadani ............... H04L 27/2636

FOREIGN PATENT DOCUMENTS

CN 107819709 A 3/2018

OTHER PUBLICATIONS

Raviteja, et al., "Orthogonal Time Frequency Space (OTFS) Modulation Based Radar System," *IEEE Radar Conference*, pp. 1-6, Apr. 22, 2019, Institute of Electrical and Electronics Engineers, Piscataway, NJ, USA.

Piccinni, et al., "A Novel Distance Measurement Technique for Indoor Positioning Systems Based on Zadoff-Chu Sequences," *15th IEEE International New Circuits and Systems Conference*, pp. 337-340, Jun. 25, 2017, Institute of Electrical and Electronics Engineers, Piscataway, NJ, USA.

Xu, et al., "Research on OTFS Modulation Applied in LTE-Based 5G Terrestrial Broadcast," *International Wireless Communications and Mobile Computing Conference*, pp. 514,519, Jun. 15, 2020, Institute of Electrical and Electronics Engineers, Piscataway, NJ, USA.

(Continued)

*Primary Examiner* — Kwasi Karikari
(74) *Attorney, Agent, or Firm* — Leydig, Voit & Mayer, Ltd.

(57) ABSTRACT

A method for user localization in a cellular network includes receiving, by a receiver unit, Orthogonal Time Frequency Space (OTFS) modulated Constant-Amplitude-Zero-Autocorrelation (CAZAC) sequences generated and transmitted in a Doppler-delay domain by a transmitter unit. The method further includes estimating, by the receiver unit, Doppler shift and/or relative speed between the transmitter unit and the receiver unit by filtering the received OTFS modulated CAZAC sequences.

16 Claims, 5 Drawing Sheets

(56) References Cited

OTHER PUBLICATIONS

Alsharif, et al., "Zadoff-Chu Coded Ultrasonic Signal for Accurate Range Estimation," *25$^{th}$ European Signal Processing Conference*, pp. 1250-1254, Aug. 28, 2017, Institute of Communication and Computer Systems, Zografou, Greece.

Menta, et al., "On the Performance of AoA-Based Localization in 5G Ultra-Dense Networks," *IEEE Access 7*, pp. 33870-33880, Mar. 27, 2019, Institute of Electrical and Electronics Engineers, Piscataway, NJ, USA.

Gaudio, et al., "On the Effectiveness of OTFS for Joint Radar Parameter Estimation and Communication," *IEEE Transactions on Wireless Communications* 29, 9, pp. 5951-5965, Jun. 5, 2020, Institute of Electrical and Electronics Engineers, Piscataway, NJ, USA.

Cohere Technologies et al.; "OTFS Modulation Waveform and Reference Signals for New RAT"; 3GPP Draft; R1-162930 OTFS Waveform for New Rat, 3$_{rd}$ Generation Partnership Project (3GPP), Mobile Competence Centre; 650, Route Des Lucioles; F-06921 Sophia-Antipolis Cedex; France; No. Busan, South Korea; Apr. 2, 2016; pp. 1-16; XP051080414; Retrieved from the Internet: URL: http://www.3gpp.org/ftp/tsg_ran/WG 1 _RL 1 /Tsg R 1 _84b/Docs;.

\* cited by examiner

USER LOCALIZATION IN A WIRELESS CELLULAR NETWORK

CROSS REFERENCE TO RELATED APPLICATIONS

This application is a U.S. National Phase application under 35 U.S.C. § 371 of International Application No. PCT/EP2020/067131, filed on Jun. 19, 2020. The International Application was published in English on Dec. 23, 2021, as WO 2021/254636 A1 under PCT Article 21(2).

FIELD

Embodiments of the present invention relate to methods and devices for user localization in a cellular network.

BACKGROUND

Users localization can present a major challenge for the current cellular network generation (LTE) and it is expected to be important in the development and deployment of the next generation (5G) and beyond. For example, network operators (or over-the-top operators) may take advantage of the knowledge of users' positions and speeds to increase their revenue by delivering additional (on-demand) services tailored on users' contextual information. Moreover, such information may be shared with public authorities in order to assist first responders in search-and-rescue operations during any sort of emergencies. As will be appreciated by those skilled in the art, there is a large number of further application possibilities.

Users' mobility exacerbates the complexity of cellular communications and the users' localization. In particular, any moving terminal (without loss of generality herein sometimes briefly denoted UE) suffers from the effects of Doppler shift, i.e., the change in the wave frequency observed at the receive side when either the transmitter or the receiver move relatively to each other. To mitigate the effects of Doppler Shift, an Orthogonal Frequency Division Multiplexing (OFDM) system, such as LTE, makes use of a low number of subcarriers, which in turn increases the subcarrier spacing thus improving the tolerance against potential shifts. This leads to a suboptimal solution as it eventually causes (more easily) the inter-symbol interference (ISI), since the guard interval (GI) is accordingly shortened, making the system more sensitive to multipath fading.

Moreover, although it may be possible to estimate the UE speed based on successive distance measurements over time, this approach shows several limitations in terms of sensitivity, which totally defeats its purpose. In particular, the distance measurements are quantized at a step $\Delta d$ proportional to the system sampling time $T_s$, i.e. $\Delta d = c \, T_s$, where c is the speed of light, thus forcing to calculate users' speeds over a large number of sampling times neglecting any possible deviation from the average speed.

Orthogonal Time Frequency Space modulation (OTFS), as described in R. Hadani et al., "Orthogonal Time Frequency Space Modulation", IEEE Wireless Communications and Networking Conference (WCNC), San Francisco, Calif., 2017, is gaining the interest of the research community as it solves the impairments of Doppler shift by being directly designed in the Doppler-delay domain. Indeed, the OTFS channel modeling converts the time-varying multipath channel into a time-independent two-dimensional channel in the Doppler-delay domain. Simulation results show that OTFS can detect a Doppler shift up to the subcarrier spacing without any interference. This translates in the possibility of jointly estimating distance and speed of every connected UEs.

Most of the state-of-the-art literature regarding OTFS addresses its communication performances of OTFS and its advantages in terms of bit error rate (BER) against receive signal-to-noise ratio (SNR) in comparison with OFDM. In particular, as described in P. Raviteja, K. T. Phan, Y. Hong, and E. Viterbo, "Interference cancellation and iterative detection for orthogonal time frequency space modulation". IEEE Transactions on Wireless Communications, pp. 6501-6515, 2018, it has been shown that OTFS outperforms OFDM by 11 dB at BER=10-3 with a user terminal moving at 120 km/h and keeps similar performances up to 500 km/h while OFDM demodulation is severely disrupted.

A recently submitted research paper (see P. Raviteja, K. T. Phan, Y. Hong, and E. Viterbo, "Orthogonal time frequency space (OTFS) modulation based radar system", CoRR, vol. abs/1901.09300, 2019. [Online]. Available: http://arxiv.org/abs/1901.09300) introduces an OTFS-based radar system for joint distance and speed estimation using a matched filter algorithm. The authors propose to employ OTFS instead of OFDM because of its longer range, faster tracking rate and larger Doppler frequency estimation, while keeping all the advantages of a multi-carrier modulation. However, this work is limited to radar systems and the authors do not envisage any implementation of an OTFS-based localization technique in cellular networks.

The technology disclosed in CN 107819709 A provides a moving target detection method via OTFS modulation. The inventors envision an active system in which the targets transmit OTFS-modulated signals to a receiver that performs channel estimation in the Doppler-delay domain and infers the number of moving targets. However, the system according to the proposed solution can be employed only for localization purposes and can only infer the number of moving targets disregarding their positions.

The 3GPP document "OTFS Modulation Waveform and Reference Signals for New RAT", R1-162930, 3GPP TSG RA WG1 Meeting #84-bis Busan, South Korea, Apr. 11-15, 2016 discusses the possibility of employing OTFS modulation for 5G Reference Signals (RSs). Specifically, this work focuses on designing orthogonal RS sequences in the Doppler-delay domain, which keep their orthogonality after the channel effects in order to multiplex several antenna ports on the same Doppler-delay resource grid. Although the authors provide numerical results illustrating the advantages of OTFS over OFDM, their analysis is limited to the system throughput and Block Error Rate (BLER).

The current generation of cellular network (LTE) implements several localization techniques standardized by 3GPP (for reference, see del Peral-Rosado, J. A., Raulefs, R., López-Salcedo, J. A., & Seco-Granados, G. (2017). Survey of cellular mobile radio localization methods: From 1G to 5G. IEEE Communications Surveys & Tutorials, 20(2), 1124-1148), which are based on observed data or on a trilateration process. The most relevant techniques belonging to the former class are Cell ID (CID), which assumes that the user is localized at the base station (eNB) coordinates and Radio Frequency Pattern Matching (RFPM), which is based on fingerprinting of the Received Signal Strength (RSS). The latter class of techniques offers better accuracy as it involves three or more eNBs during the localization process. In particular, Uplink Time Difference of Arrival (UTDoA) compares the time difference of arrival of uplink signals sent by the UE to Localization Measurement Units (LMUs) placed at known locations in the core network. Besides, Observed Time Difference of Arrival (OTDoA) considers the time difference of arrival at the UE side among Positioning Reference Signals (PRSs) sent by a number of eNBs. Both techniques infer the location of the device by applying the trilateration procedure.

The above-mentioned 3GPP techniques suffer from several impairments due to the communication channel with the UE. Disregarding the first class of techniques, which offers a coarse indication of the UE position, the second class may show little accuracy due to difficult radio propagation conditions. Such problems are exacerbated in case of fast-moving UEs due to a two-fold reason: the former being the limits of OFDM in high-speed conditions, the latter being the finite LTE sampling time that leads to low sensitivity in ranging measurements thus in the inferred indirect speed measurements.

SUMMARY

Embodiments of the present invention provide a method for user localization in a cellular network. The method includes receiving, by a receiver unit, Orthogonal Time Frequency Space (OTFS) modulated Constant-Amplitude-Zero-Autocorrelation (CAZAC) sequences generated and transmitted in a Doppler-delay domain by a transmitter unit. The method further includes estimating, by the receiver unit, Doppler shift and/or relative speed between the transmitter unit and the receiver unit by filtering the received OTFS modulated CAZAC sequences.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
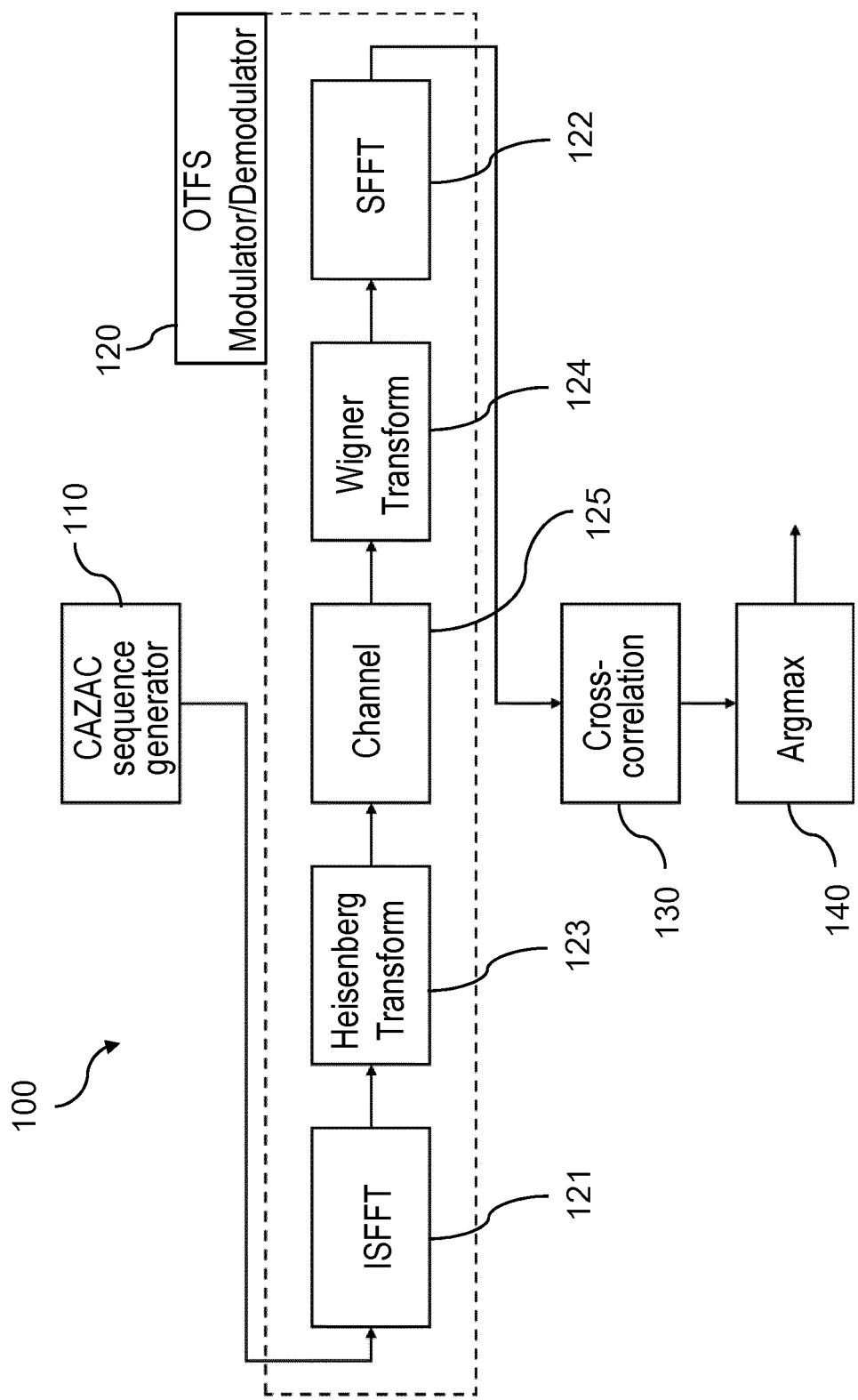
FIG. 1 is a schematic view illustrating a full transmission chain for a CAZAC sequence in a system for user localization in a cellular network in accordance with an embodiment of the present invention.

Embodiments of the present invention improve and further develop a method and devices for user localization in a cellular network in such a way that the accuracy of position and speed determination of user terminals is improved, in particular in case of fast-moving user terminals.

In accordance with embodiments of the present invention, a method for user localization in a cellular network comprising:

receiving, by a receiver unit, Orthogonal Time Frequency Space (OTFS) modulated CAZAC sequences generated and transmitted in the Doppler-delay domain by a transmitter unit; and estimating, by the receiver unit, Doppler shift and/or relative speed between the transmitter unit and the receiver unit by filtering the received OTFS modulated CAZAC sequences.

Embodiments of the present invention also provide a device for user localization in a cellular network. The device includes at least one receiver unit. The at least one receiver unit is configured to receive Orthogonal Time Frequency Space (OTFS) modulated Constant-Amplitude-Zero-Autocorrelation (CAZAC) sequences generated and transmitted in the Doppler-delay domain by a transmitter unit, and to estimate Doppler shift and/or relative speed between the transmitter unit and the receiver unit by filtering the received OTFS modulated CAZAC sequences.

Embodiments of the present invention also provide a device for user localization in a cellular network. The device includes at least one transmitter unit. The at least one transmitter unit is configured to generate Orthogonal Time Frequency Space (OTFS) modulated Constant-Amplitude-Zero-Autocorrelation (CAZAC) sequences, and to transmit the OTFS modulated CAZAC sequences in the Doppler-delay domain.

Embodiments of the present invention provide a localization solution for a wireless system based on OTFS over OFDM modulation. In particular, embodiments of the present invention relate to a cellular network-based solution for user localization robust to the Doppler shift experienced by (fast) moving users via an OTFS modulation scheme. Such a method allows for a joint range and radial speed estimates for user terminals in 4G cellular network, while it achieves full knowledge of the user terminals' speed vector in a 5G-and-beyond networks. Embodiments of the present invention introduce the usage of OTFS to build a complete localization system within a wireless cellular network by means of ideal-autocorrelation sequences.

Embodiments of the present invention relate to a cellular network-based localization solution that employs OTFS modulation and that can be readily integrated in existing 3GPP physical layer stacks. In addition, the solution according to embodiments of the present invention is robust against high speed of cellular user and it greatly improves the localization accuracy compared to existing cellular-based localization solutions by directly measuring users' distance and radial speed. Finally, this technology may achieve a complete knowledge of users' speed (modulo and direction) when 5G networks are in place, thus opening up to the possibility of tailoring ad-hoc services on users' behaviors.

An idea behind ranging measurements in LTE (and 5G) according to embodiments of the present invention is using Constant-Amplitude-Zero-Autocorrelation (CAZAC) sequences, that is, sequences showing almost impulsive discrete autocorrelation. Some of the relevant LTE physical signals used for Time-of-Arrival (ToA) measurements are the uplink Sounding Reference Signal (SRS) and the downlink Positioning Reference Signal (PRS). In particular, a receiver may be configured to calculate the cross-correlation between the receive replicas of such signals and their local copies, and to relate the peak lag (ToA) to the flight time, thus to the travelled distance by the radio wave. In particular, in accordance with embodiments of the present invention, a base station may be configured to transmit OTFS-modulated CAZAC sequences in the Doppler-delay domain in order to achieve time and speed estimates of each UE connected with the base station. Specifically, the CAZAC sequences may be filtered at the receiver to estimate the UE delay, Doppler shift, and UE speed.

The filtering at the receiver may be performed as a matched filtering and may include processing of the received signal by calculating the crosscorrelation of the received signal with its original copy that is a-priori known at the receiver. In other words, matched filtering or performing the cross-correlation operation on the demodulated CAZAC sequences lead to the same result as such sequences are symmetric. Specifically, a matched filter may be employed at the receive side, whose impulse response is a conjugated and time-reversed version of the transmitted CAZAC sequences. Due to the symmetry of such sequences, the output of the matched filter is equivalent to that of the crosscorrelation, so the two operations are interchangeable.

According to embodiments of the present invention, a method for user localization in a cellular network comprises the steps of generating, by a transmitter unit, Orthogonal Time Frequency Space (OTFS) modulated Constant-Amplitude-Zero-Autocorrelation (CAZAC) sequences; transmitting, by the transmitter unit, the OTFS modulated CAZAC sequences in the Doppler-delay domain; receiving, by a receiver unit, the OTFS modulated CAZAC sequences; and estimating, by the receiver unit, Doppler shift and/or relative speed between the transmitter unit and the receiver unit by filtering the received OTFS modulated CAZAC sequences.

According to embodiments of the present invention, a system for user localization in a cellular network comprises at least one transmitter unit and at least one receiver unit, wherein the at least one transmitter unit is configured to generate Orthogonal Time Frequency Space (OTFS) modulated Constant-Amplitude-Zero-Autocorrelation (CAZAC) sequences and to transmit the OTFS modulated CAZAC sequences in the Doppler-delay domain, and wherein the at least one receiver unit is configured to receive the OTFS modulated CAZAC sequences and to estimate Doppler shift and/or relative speed between the transmitter unit and the receiver unit by filtering the received OTFS modulated CAZAC sequences. For instance, the at least one transmitter unit may be co-located or associated with a base station of the cellular network and the at least one receiver unit may be co-located or associated with a user terminal connected with the base station, or vice versa.

According to embodiments of the present invention, a base station of a cellular network is configured to transmit OTFS-modulated CAZAC sequences in the Doppler-delay domain in order to achieve time and speed estimates of each mobile terminal, i.e. UE, connected with the base station. For instance, considering a time-frequency channel (or signal) plane consisting of M frequency samples and N time samples obtained by discretizing the continuous plane every T seconds and $\Delta f=1/T$ Hertz, this leads to a M×N matrix. By applying the 2D Symplectic Fast Fourier Transform (SFFT), such plane becomes a grid of M delay samples and N Doppler samples spaced by $1/(MT)$ and $1/(NT)$, respectively. Therefore, after filtering a CAZAC sequence at the receiver, applying a method according to embodiments of the present invention can achieve a resolution of $1/(MT)$ and $1/(NT)$ when estimating the UE delay and Doppler shift, respectively.

An estimate of the speed v of a UE may be achieved starting from the Doppler shift $f_D$ via the equation $$v = \frac{f_D}{f_c} c,$$

where $f_c$ denotes the carrier frequency, which is known by design.

FIG. 1 schematically illustrates a full transmission chain 100 for a CAZAC sequence in a system for user localization in a cellular network in accordance with an embodiment of the present invention. According to embodiments of the present invention, the transmission chain 100 may be executed in both directions, i.e. in downlink as well as in uplink, which means that both a base station and the user terminals connected with the base station are equipped with a CAZAC sequence generator 110 and a OTFS modulator/demodulator component 120. The OTFS modulator/demodulator component 120 employed in the embodiment of FIG. 1 is a well-known OTFS modulator/demodulator described in detail, e.g. in K. R. Murali and A. Chockalingam: "On OTFS Modulation for High-Doppler Fading Channels", 2018, Information Theory and Applications Workshop (ITA), San Diego, Calif., 2018, pp. 1-10, which is incorporated herein by way of reference in its entirety, in particular section III. regarding OTFS modulation.

According to the illustrated embodiment, on the modulation side, the OTFS modulator/demodulator component 120 comprises an ISFFT module 121, which is configured to generate an inverse-scaled fast Fourier transform of the CAZAC sequence, together with a module 123 for generating a Heisenberg transformation, which is a generalization of the OFDM transform, of the sequence. On the demodulation side, the OTFS modulator/demodulator component 120 comprises a module 124 for generating a Wigner transformation (inverse of the Heisenberg transform), which is a generalization of the inverse OFDM transform, of a received sequence together with an SFFT module 122, which is configured to generate a scaled fast Fourier transform of the sequence. The channel module 125 located between the modulation side and the demodulation side indicates the physical transmission of the modulated/transformed CAZAC sequence via the air interface. As will be appreciated by those skilled in the art, in particular the transformation modules 123, 124 may be omitted or may be replaced by other transformation modules that generate different transformations of the respective input sequence, depending on the specific application requirements.

According to embodiments of the present invention, when a CAZAC sequence is encoded (e.g., by means of ISFFT module 121 and transformation module 123, as shown in FIG. 1) and transmitted over a generic wireless channel (i.e. channel 125, as shown in FIG. 1), the sequence, when received at a receiver, it is decoded to infer the respective user's position and speed. As will be described in detail below, the decoding may be performed by generating a crosscorrelation function between a receive replica of the CAZAC sequence and its local copy by means of crosscorrelation component 130 and by determining the maximum of the crosscorrelation function by means of the 'argmax' component 140.

Figure 2:
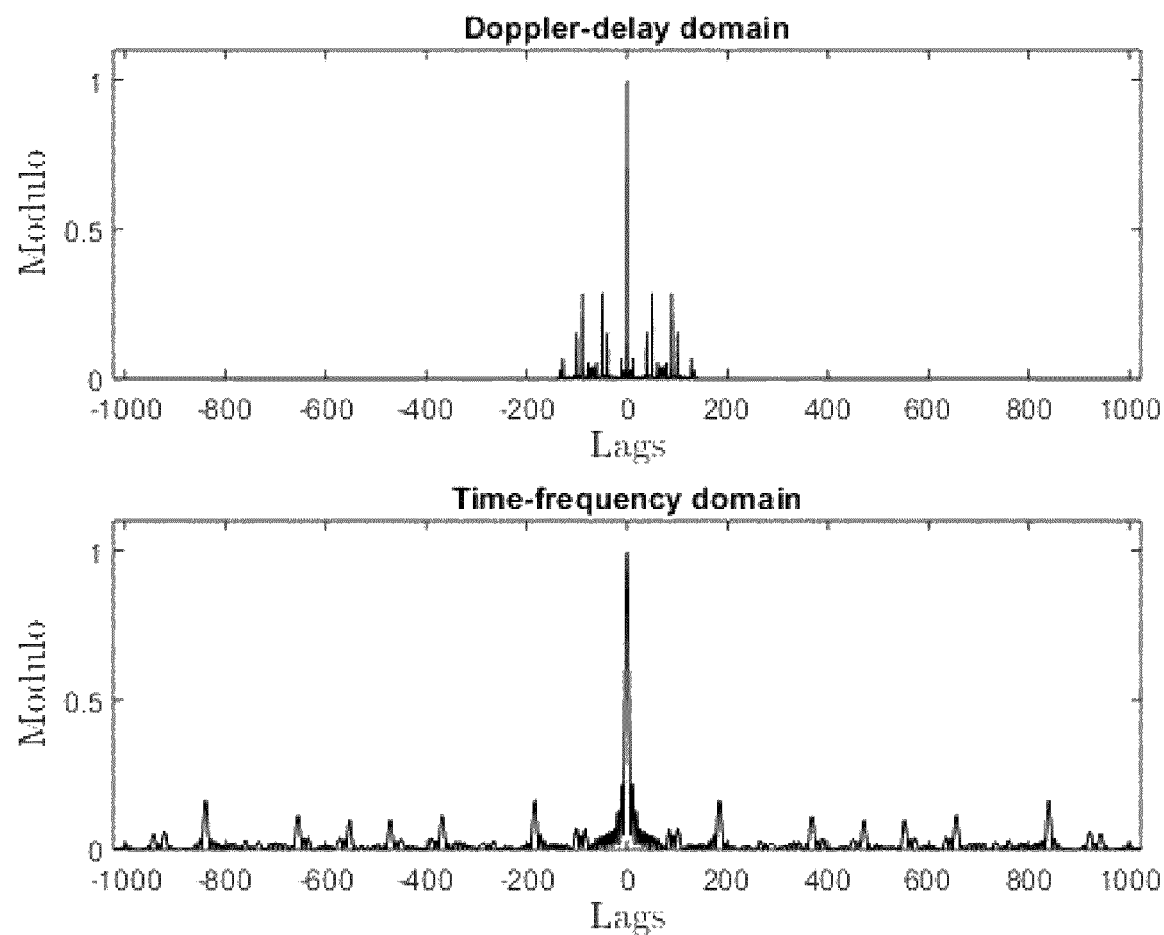
FIG. 2 is a diagram illustrating the performance of a CAZAC sequence both in the Doppler-delay domain and in the Time-frequency domain according to some embodiments.

FIG. 2 shows the performances of a well-known CAZAC sequence, namely a Zadoff-Chu Sequence (already employed in LTE, e.g. in SRS), in terms of autocorrelation in both signal domains. Even if the autocorrelation function spreads across a wider range of lags after the ISFFT, the sequence retains its good autocorrelation property by showing a ratio of around 10 dB between the peak and the spurious peaks.

According to an embodiment of the present invention, the transmission of the OTFS modulated CAZAC sequences in the Doppler-delay domain may be integrated in the physical layer protocol stack of the cellular network, for instance the 3GPP LTE stack. In this regard, FIG. 2 exemplarily illustrates the situation for the LTE downlink radio frame. As will be appreciated by those skilled in the art, the same result can be extended in the uplink case by means of similar approach.

The portion of the LTE downlink frame depicted in FIG. 2 includes four subframes SF2, SF3, SF4, and SF5 in the time domain, each consisting of two equally sized slots with a number of seven OFDM symbols (normal cyclic prefix) and, in the frequency domain, a number of six physical resource blocks, PRBs, each comprised of 12 subcarriers. The solid filled elements show the positions of the PRS (Positioning Reference Signals) in the LTE downlink radio frame. It should be noted that the figure shows only those subframes interested by the PRS, neglecting the remaining for the sake of clarity.

Figure 3:
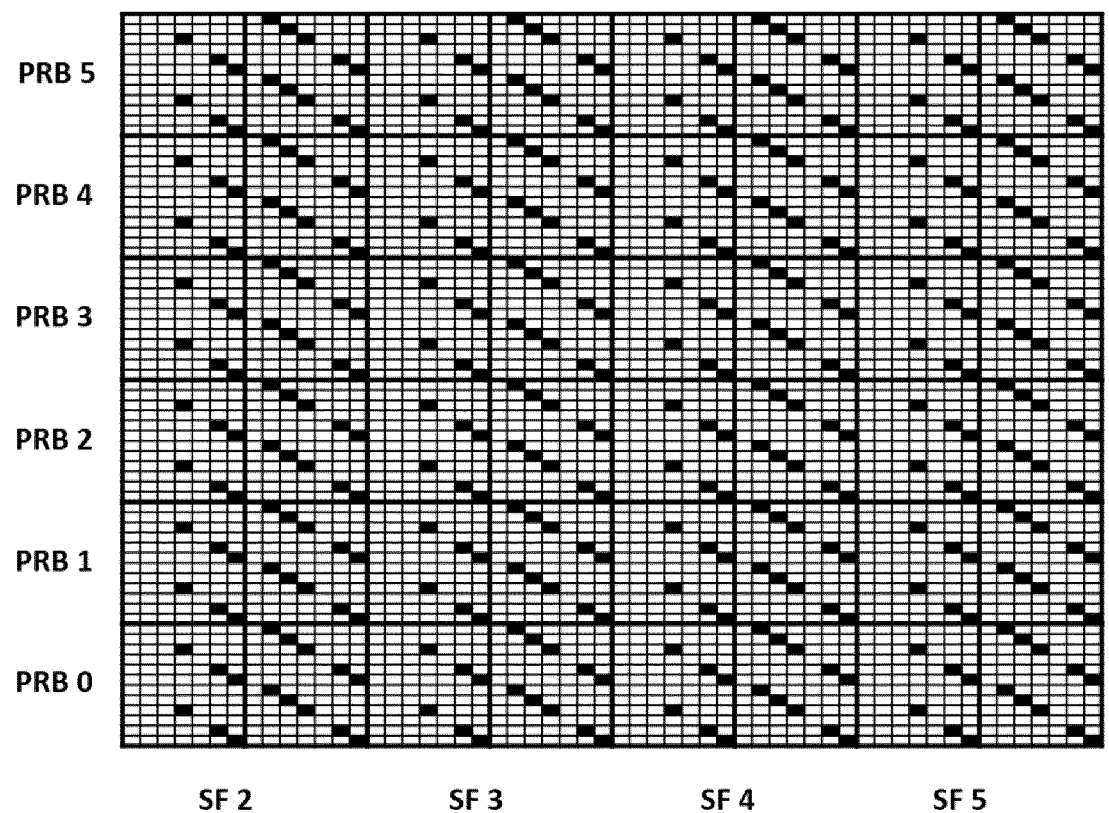
FIG. 3 is a diagram illustrating a portion of an LTE downlink frame showing the PRS time-frequency allocation according to some embodiments.
Figure 4:
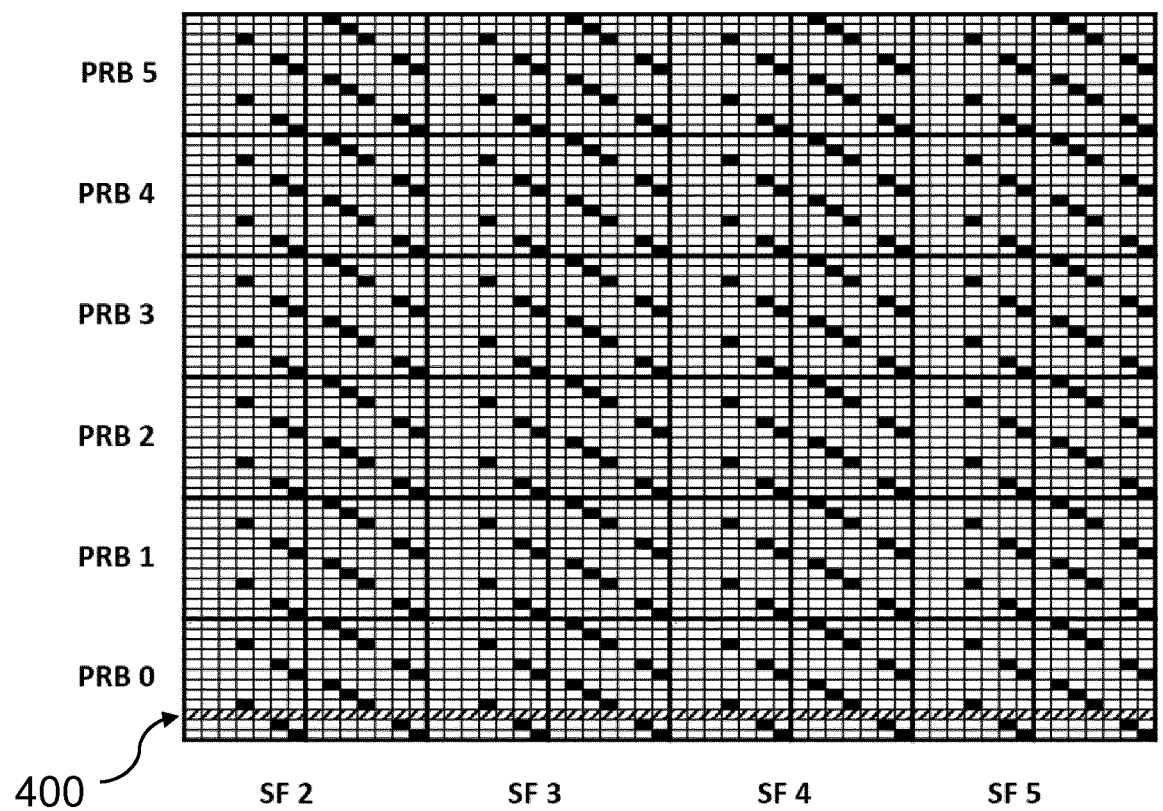
FIG. 4 is a diagram illustrating the portion of the LTE downlink frame of FIG. 3 including an OTFS-transformed CAZAC sequence in accordance with an embodiment of the present invention.

As previously mentioned, the sensitivity of the proposed solution in terms of Doppler shift estimate depends on the number of time samples N. Specifically, in accordance with an embodiment of the present invention, it may be provided that the Doppler shift is estimated by transmitting an ISFFT-transformed CAZAC sequence over a single subcarrier through each radio frame. This is achieved by setting parameters N (i.e. the number of time samples) and M (i.e. the number of frequency samples) accordingly. Since a typical LTE radio frame contains N=140 OFDM symbols, parameter N is set to N=140 and parameter M is set to M=1, thus preserving complete compatibility with the LTE protocol stack. FIG. 4 depicts the amended LTE radio frame including the ISFFT-transformed CAZAC sequence allocation 400 (pattern fill). It should be noted that FIG. 4 depicts the same portion of the LTE downlink frame as also shown in FIG. 3. Again, an adaptation to an LTE uplink frame is straightforward, as will be appreciated by those skilled in the art.

According to embodiments of the present invention, which is particularly suitable in highway scenarios, it may be provided that additional angle measurements are exploited for carrying out full-speed estimates. These embodiments rely on the specific feature of the 5th cellular network generation (5G) with millimeter waves communications that may employ directional beamforming to execute angle measurements at the base stations, i.e. angle-of-arrival (AoA) in uplink and angle-of-departure (AoD) in downlink. Although there is no guideline regarding the exploitation of such measurements for other-than-communication purposes in the current cellular standard, it may be provided in accordance with an embodiment of the present invention to generate OTFS-modulated CAZAC sequences and to enrich these sequences with angular information. This would be sufficient to infer the full speed vector of a UE, as will be explained hereinafter.

Figure 5:
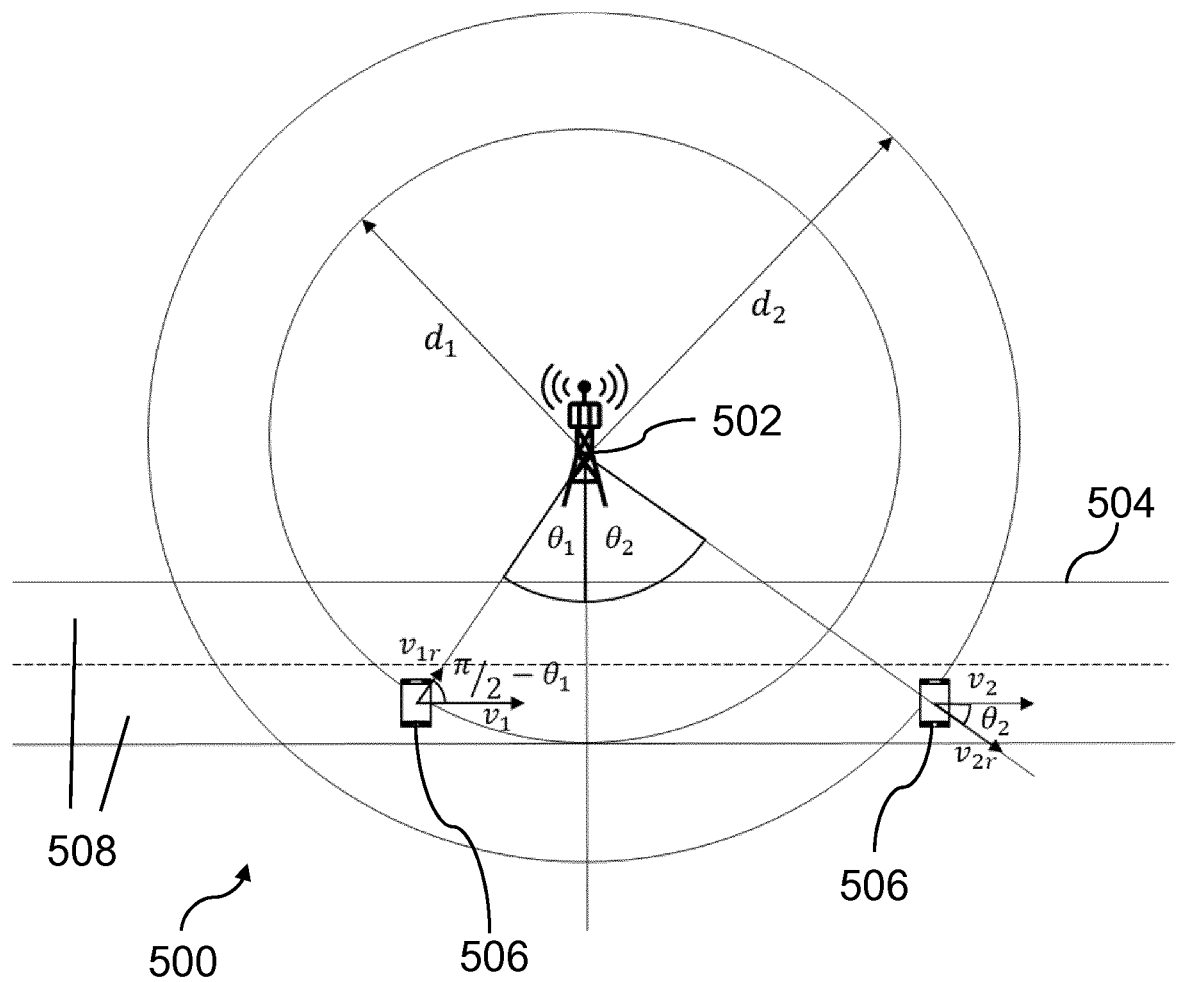
FIG. 5 is a schematic view illustrating a 5G-based localization system in a highway scenario in accordance with an embodiment of the present invention.

Let us consider a highway scenario 500 and a 5G New Radio (5G-NR) base station 502, as depicted in FIG. 5. In such scenario, the location and orientation of the 5G-NR base station 502 with respect to the highway 504 are known by design. Moreover, as vehicles (together with the respective UEs 506) move along the highway lanes 508, their average motion direction (over time) is parallel to the highway 504 (i.e., by averaging their direction over time the lane-change phases are neglected). This information, together with the ToA (Time of Arrival) information determined as the current travel time of a radio signal between the base station 502 and a UE 506, and the speed measurements provided by the OTFS localization according to the proposed solution, enriched with the AoA (and/or AoD) provided by the 5G-NR base station, are sufficient to calculate the UE speed modulo. In this way, full knowledge of a UE's 506 speed vector can be retrieved. In particular, given the measurement of the radial speed $v_r$, it is possible to retrieve the speed modulo v via the following equation $v_x = v/\cos \alpha$, where α denotes the angle between the radial direction and the speed direction. Such angle may be easily obtained by means of AoA (and/or AoD) measurements at the base station side. In case such AoA (or AoD) is called θ and the vertical direction is considered as the reference axis in the scenario depicted in FIG. 5, then α=θ, if θ is positive, and α=π/2−θ otherwise.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for user localization in a cellular network, the method comprising:
   receiving, by a receiver unit, Orthogonal Time Frequency Space (OTFS) modulated Constant-Amplitude-Zero-Autocorrelation (CAZAC) sequences generated and transmitted in a Doppler-delay domain by a transmitter unit; and
   estimating, by the receiver unit, Doppler shift and/or relative speed between the transmitter unit and the receiver unit by filtering the received OTFS modulated CAZAC sequences.

2. The method according to claim 1, wherein at least one of the transmitter unit and the receiver unit is associated with at least one of a base station of the cellular network or a user terminal connected with the base station.

3. The method according to claim 1, wherein the CAZAC sequences are transmitted over a single subcarrier through each radio frame.

4. The method according to claim 1, wherein the CAZAC sequences comprise Zadoff-Chu sequences.

5. The method according to claim 1, wherein the CAZAC sequences, before being transmitted by the transmitter unit, are transformed by an inverse-scaled fast Fourier transformation (ISFFT).

6. The method according to claim 1, wherein the CAZAC sequences, after being received by the receiver unit, are transformed by a scaled fast Fourier transformation (SFFT).

7. The method according to claim 1, further comprising:
applying, by the receiver unit, an autocorrelation function to the received CAZAC sequences both in the Doppler-delay domain and in a Time-frequency domain.

8. The method according to claim 1, wherein the CAZAC sequences are enriched with angular information.

9. The method according to claim 1, further comprising:
determining, by a base station of the cellular network, a speed vector of a connected user terminal by combining speed estimates obtained by filtering the received OTFS modulated CAZAC sequences with directional beamforming employed by the base station.

10. The method according to claim 9, wherein the directional beamforming is employed to execute angle measurements at the base station, the angle measurements including angle-of-arrival (AoA) measurements in uplink and/or angle-of-departure (AoD) measurements in downlink.

11. A device for user localization in a cellular network, for execution of the method according to claim 1, the device comprising at least one receiver unit, wherein the at least one receiver unit is configured
to receive Orthogonal Time Frequency Space (OTFS) modulated Constant-Amplitude-Zero-Autocorrelation (CAZAC) sequences generated and transmitted in a Doppler-delay domain by a transmitter unit, and
to estimate Doppler shift and/or relative speed between the transmitter unit and the receiver unit by filtering the received OTFS modulated CAZAC sequences.

12. The device according to claim 11, wherein the at least one receiver unit comprises an autocorrelation function that is configured to be applied to the received CAZAC sequences both in the Doppler-delay domain and in a Time-frequency domain.

13. The device according to claim 11, wherein the receiver unit is associated with at least one of: a base station of the cellular network or a user terminal connected with the base station.

14. A device for user localization in a cellular network, the device comprising at least one transmitter unit, wherein the at least one transmitter unit is configured
to generate Orthogonal Time Frequency Space (OTFS), modulated Constant-Amplitude-Zero-Autocorrelation (CAZAC) sequences, and
to transmit the OTFS modulated CAZAC sequences in a Doppler-delay domain.

15. The device according to claim 14, wherein the at least one transmitter unit comprises a CAZAC sequence generator and an OTFS modulator including a component for generating an inverse-scaled fast Fourier transformation (ISFFT) of the CAZAC sequence.

16. The device according to claim 14 or 15, wherein the transmission of the OTFS modulated CAZAC sequences in the Doppler-delay domain is integrated within a physical layer protocol stack of the cellular network.

* * * * *